United States Patent [19]

Patton et al.

[11] Patent Number: 4,580,165

[45] Date of Patent: Apr. 1, 1986

[54] GRAPHIC VIDEO OVERLAY SYSTEM PROVIDING STABLE COMPUTER GRAPHICS OVERLAYED WITH VIDEO IMAGE

[75] Inventors: Thomas Patton; George A. Ferry, both of Pittsfield, Mass.

[73] Assignee: General Electric Company, Syracuse, N.Y.

[21] Appl. No.: 599,675

[22] Filed: Apr. 12, 1984

[51] Int. Cl.[4] .......................... H04N 5/04; H04N 9/44; G09G 3/00

[52] U.S. Cl. .................................... 358/148; 358/149; 358/17; 358/903; 340/814

[58] Field of Search .................. 358/17, 149, 903, 148, 358/319, 324, 325, 158, 150, 153, 154; 340/814, 721, 745, 734, 747

[56] References Cited

U.S. PATENT DOCUMENTS

| | | | |
|---|---|---|---|
| 4,025,951 | 5/1977 | Eckenbrecht | 358/158 |
| 4,346,407 | 8/1982 | Baer et al. | 358/149 |
| 4,425,581 | 1/1984 | Schweppe et al. | 358/148 |
| 4,450,442 | 5/1984 | Tanaka | 340/814 |
| 4,498,103 | 2/1985 | Aschwarden | 358/148 |
| 4,531,154 | 7/1985 | Hallock | 358/148 |

Primary Examiner—James J. Groody
Assistant Examiner—Michael P. Dunnam
Attorney, Agent, or Firm—Stephen A. Young; Carl W. Baker

[57] ABSTRACT

A color graphic overlay system for providing high speed, high resolution color graphics display combined with a video image from a videodisc, videotape or camera. The system includes a video mixing module and a color graphics module which generates the graphics while the video mixing module performs the overlay function. A composite sync processor filters an external video composite sync signal to produce a processed horizontal sync pulse that is phase adjustable and ultimately used by a phase lock loop to lock the horizontal component of the external video composite sync signal to the horizontal component of the graphics composite sync. The phase lock loop employs the processed horizontal sync pulse to generate a high frequency clock used by the color graphics module to produce its own horizontal sync pulses. Horizontal synchronization means provide a phase adjustable window which regulates the phase lock loop to eliminate the unstable effects of gross phase differences of external video by slowly time sliding the processed horizontal sync pulse to extend or reduce its period until the phase lock loop can compensate therefor.

10 Claims, 39 Drawing Figures

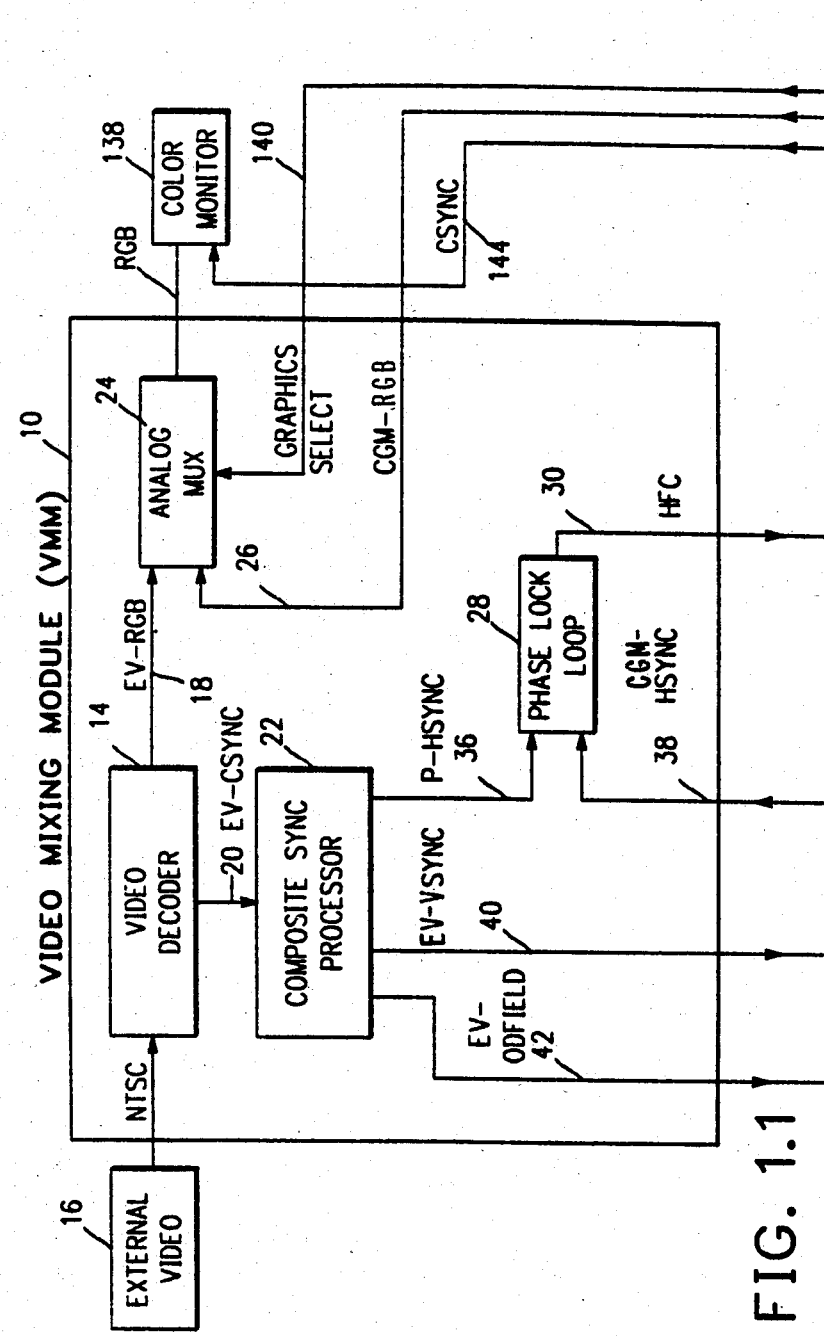
FIG. 1.1

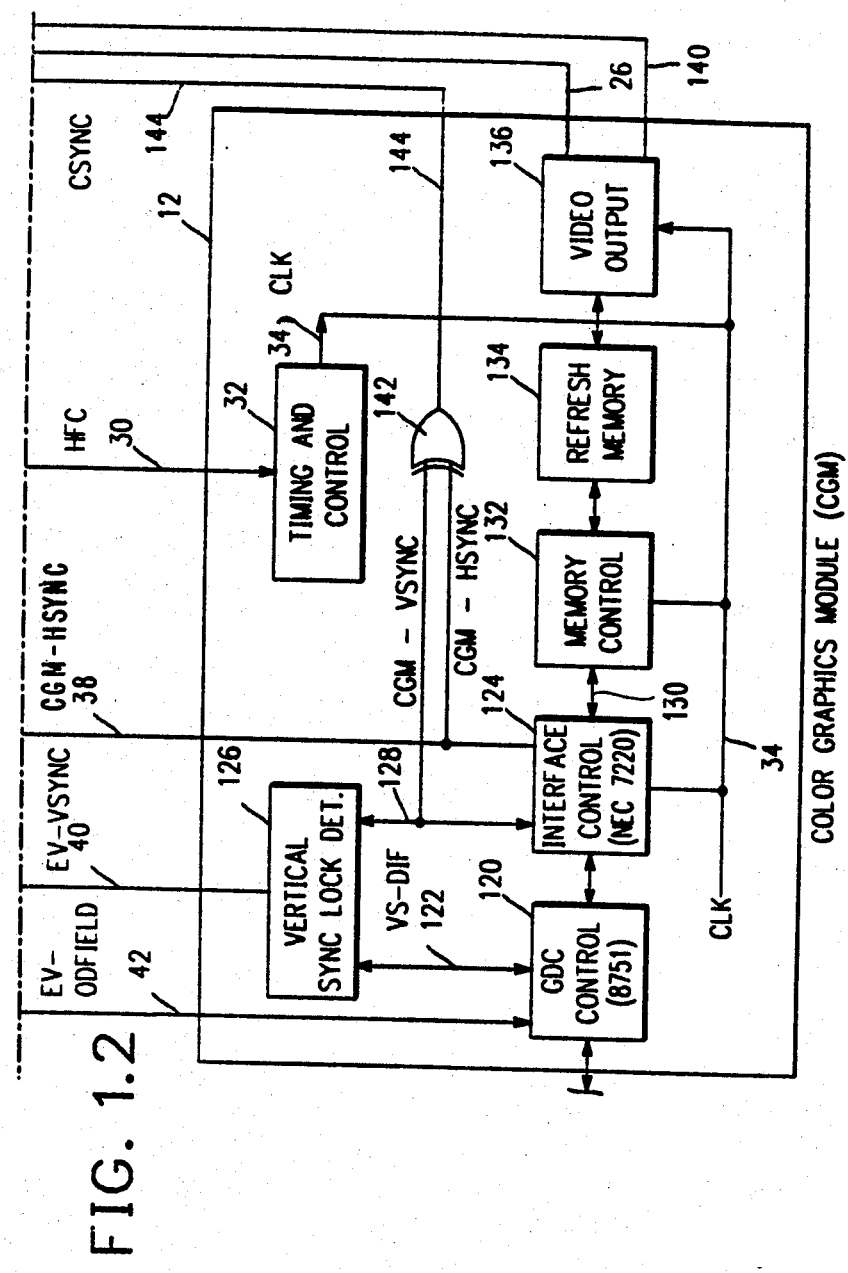
FIG. 1.2

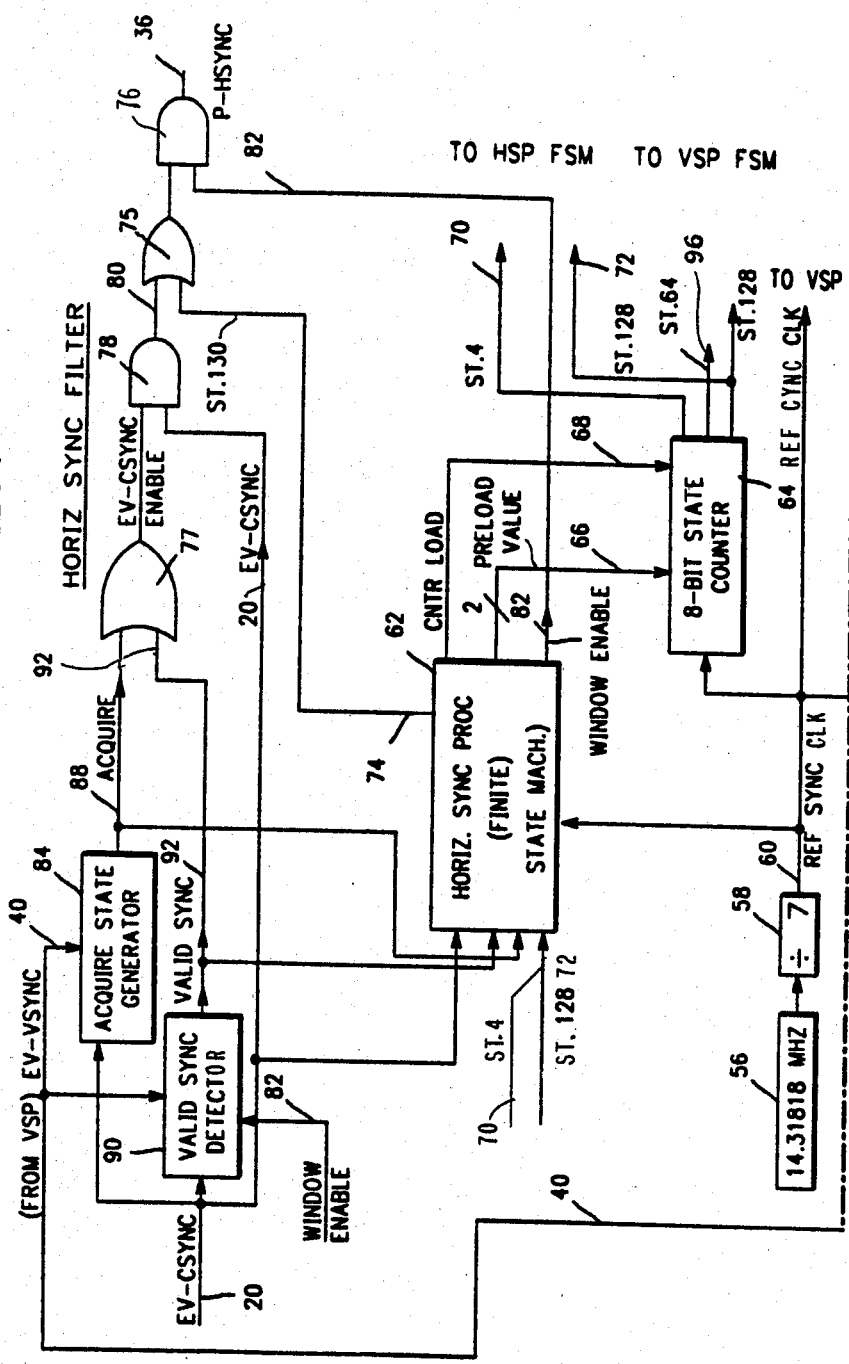
FIG. 2.1

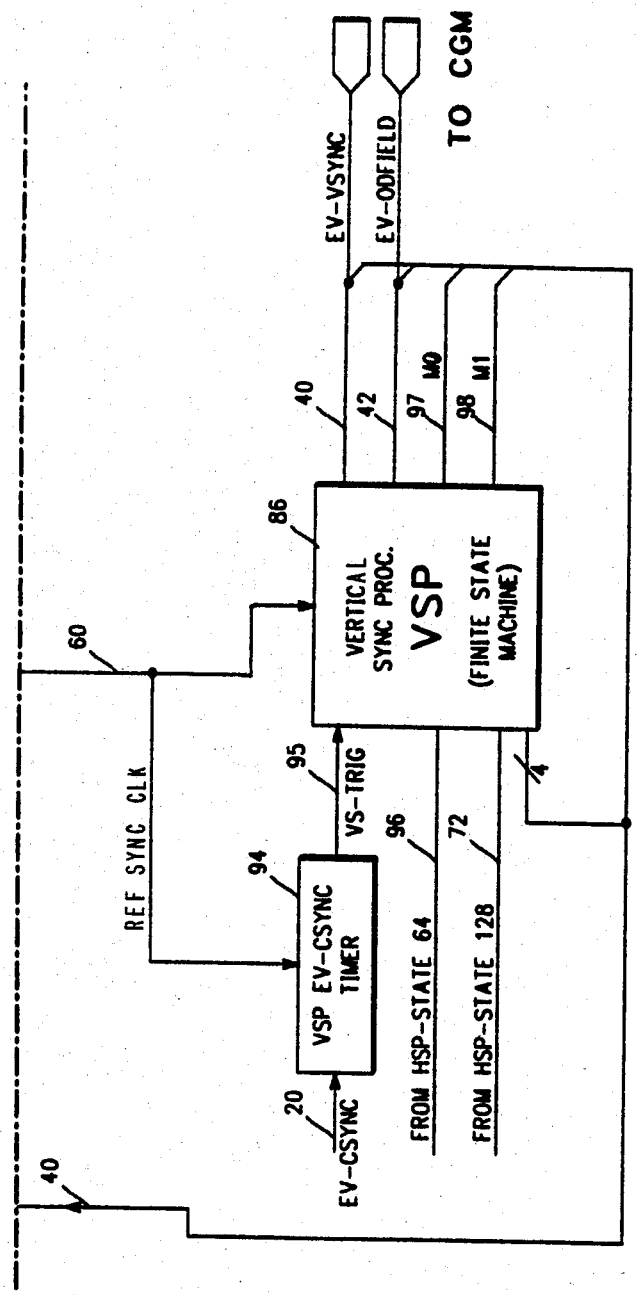
FIG. 2.2

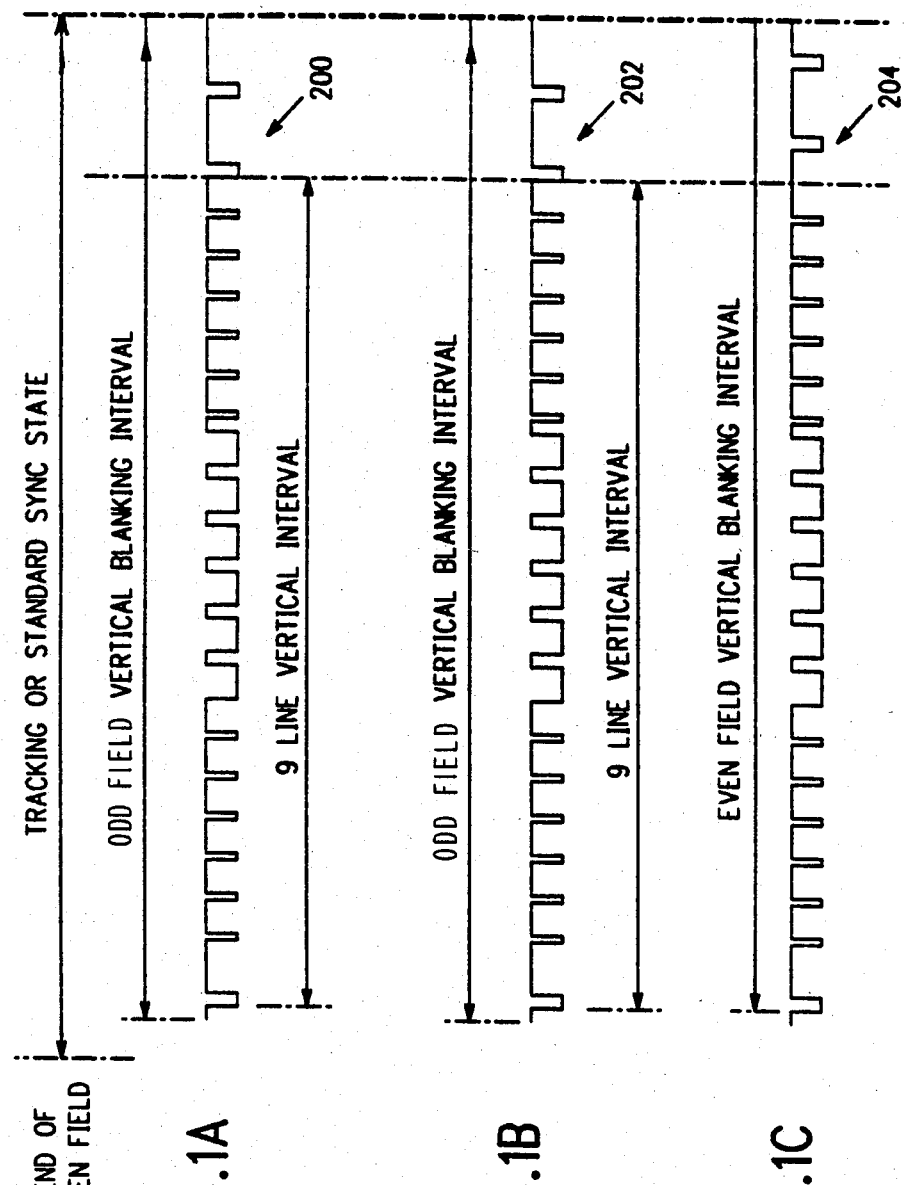

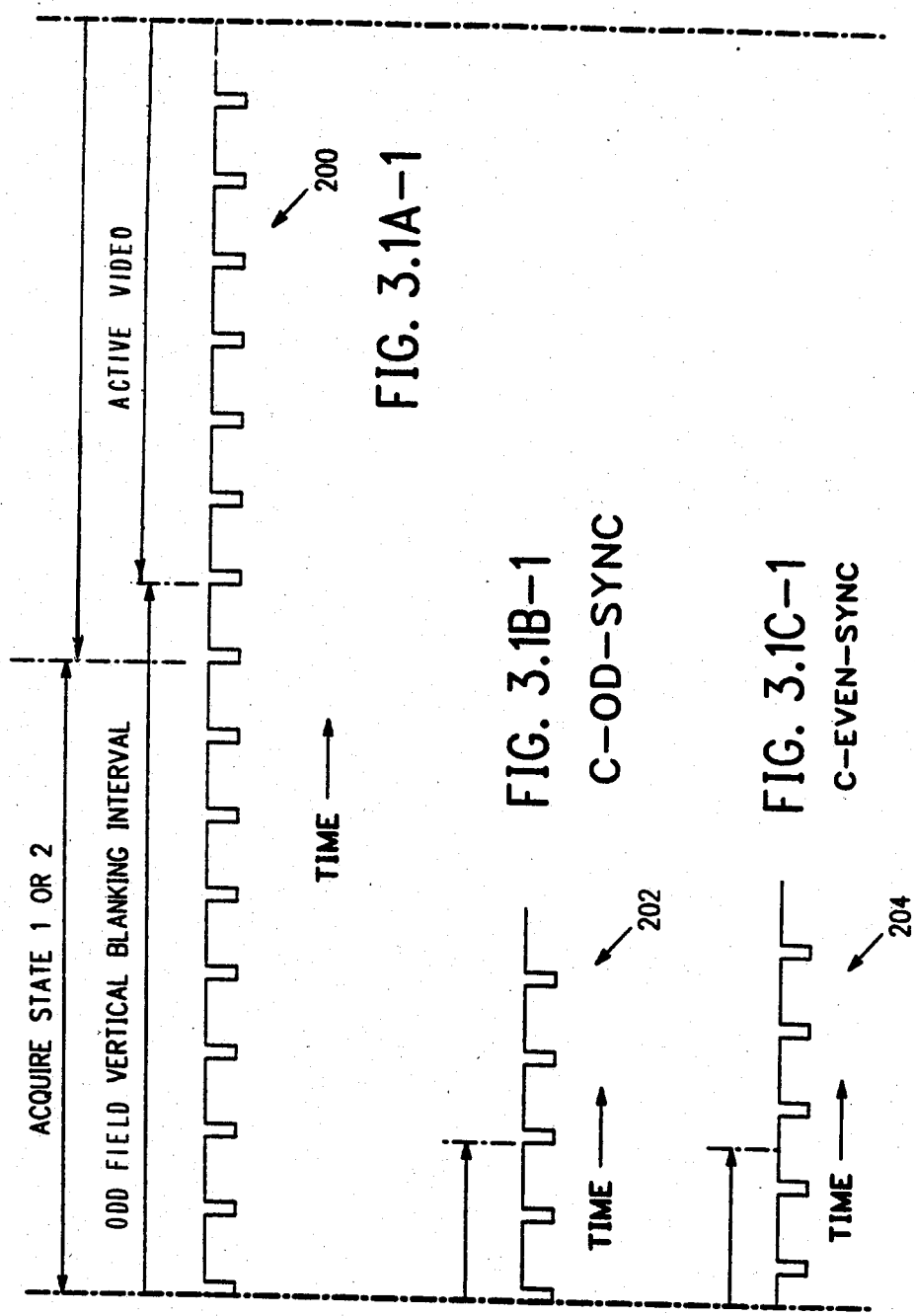

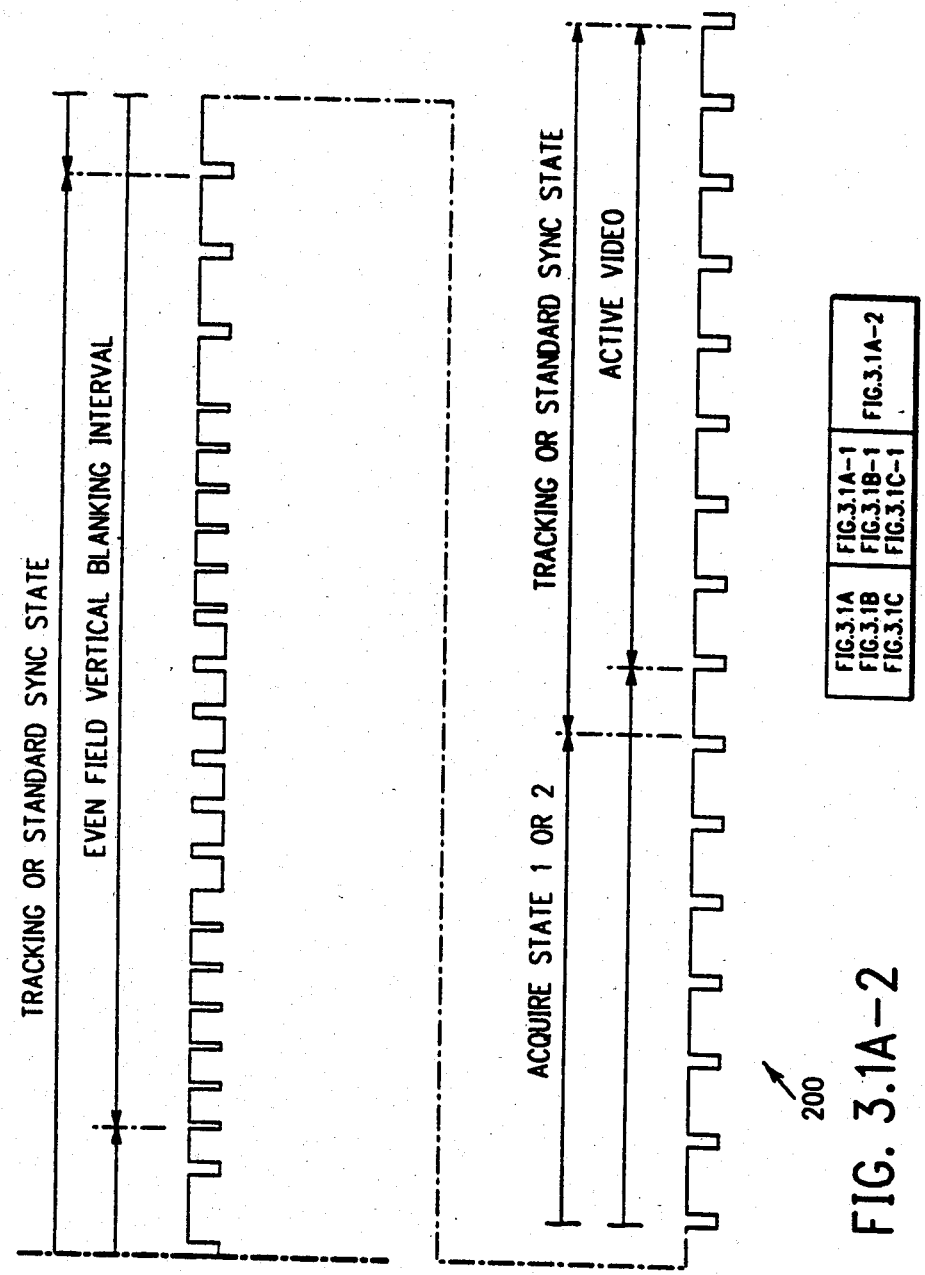
FIG. 3.1A-2

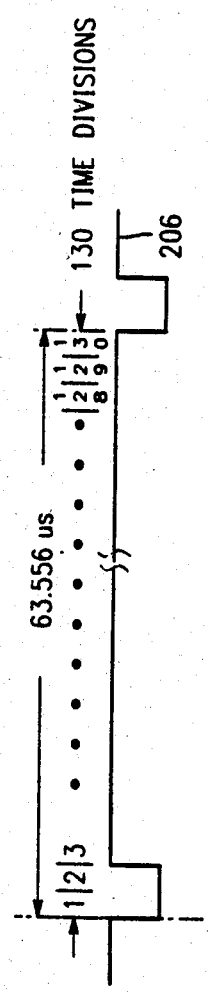
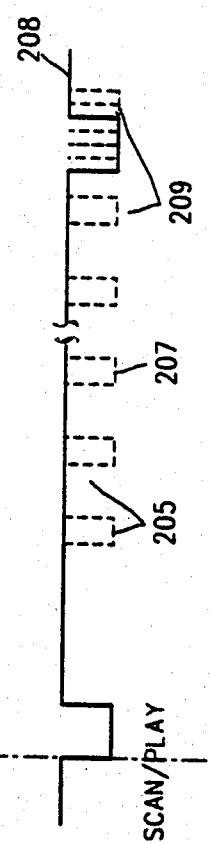
FIG. 3.1D
HC EV-CSYNC
FIG. 3.1E
EV-CSYNC
DURING NORMAL/SEARCH/SCAN/PLAY
FIG. 3.1F
HC EV-CSYNC
FIG. 3.1G
PW

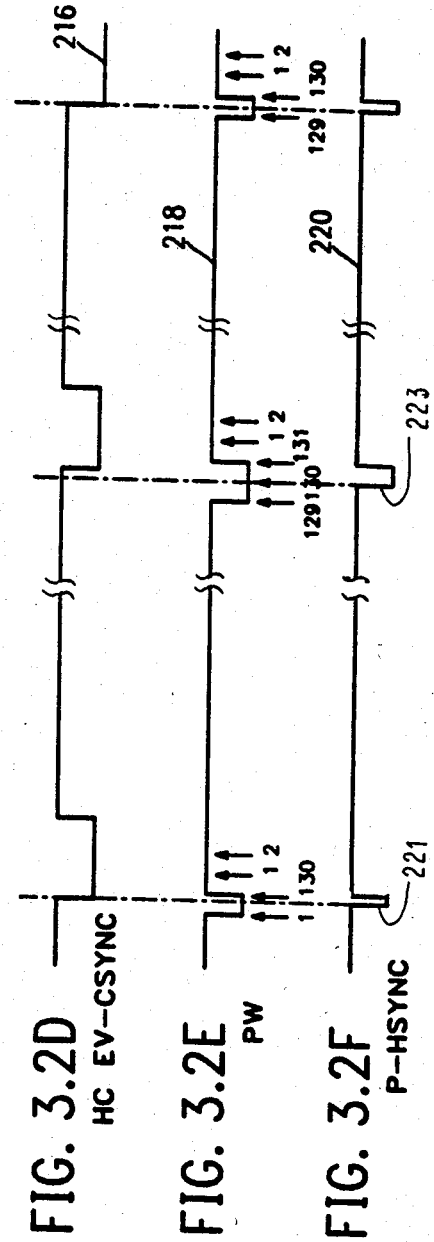
FIG. 3.2A HC EV-CSYNC
FIG. 3.2B PW
FIG. 3.2C P-HSYNC
FIG. 3.2D HC EV-CSYNC
FIG. 3.2E PW
FIG. 3.2F P-HSYNC

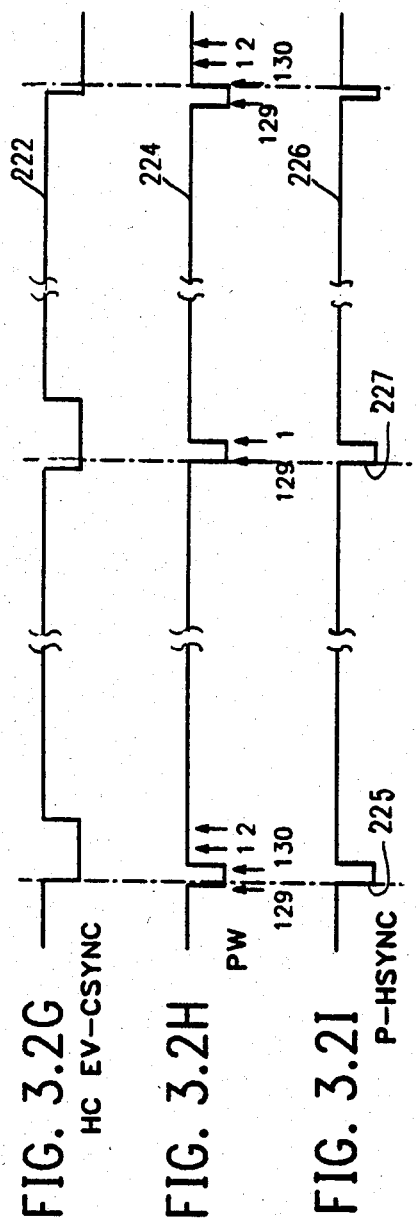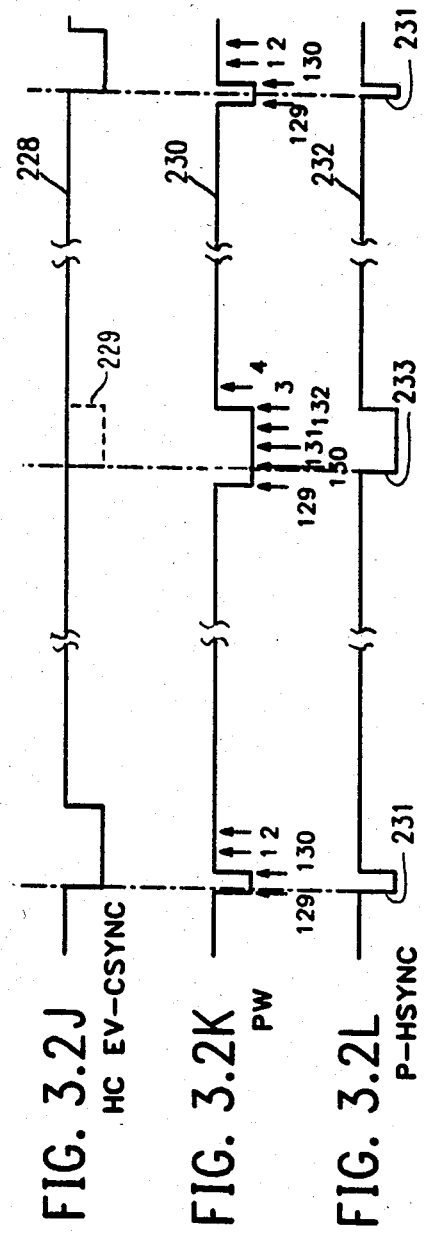

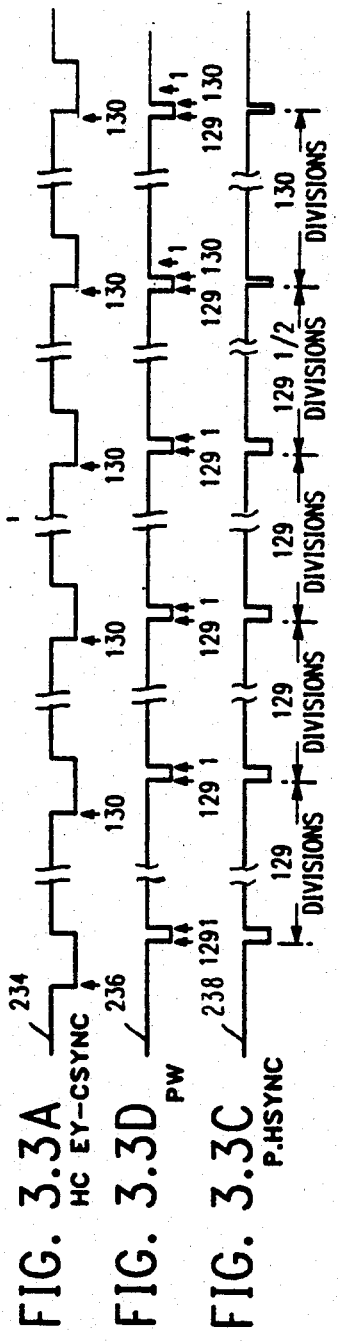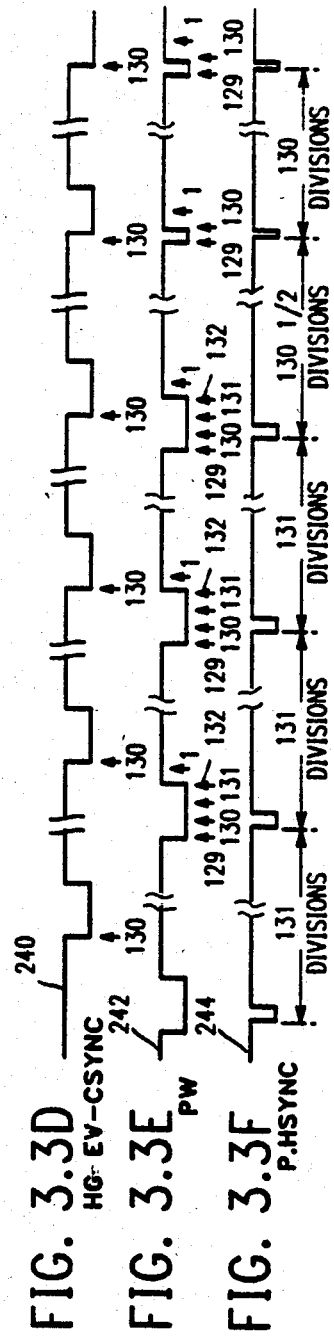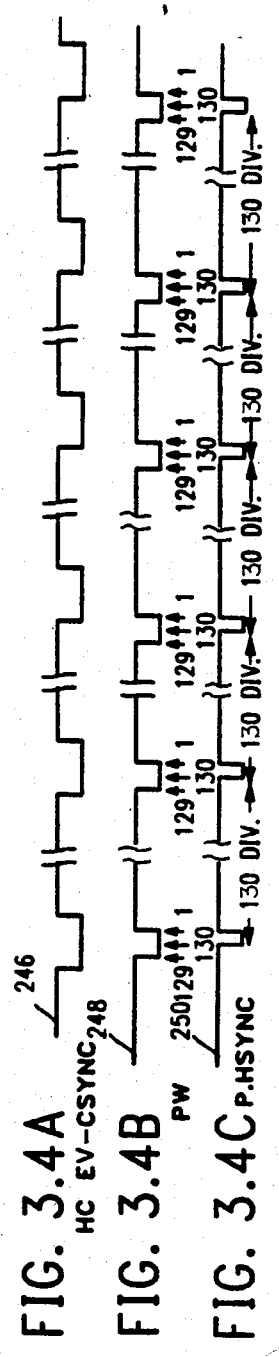

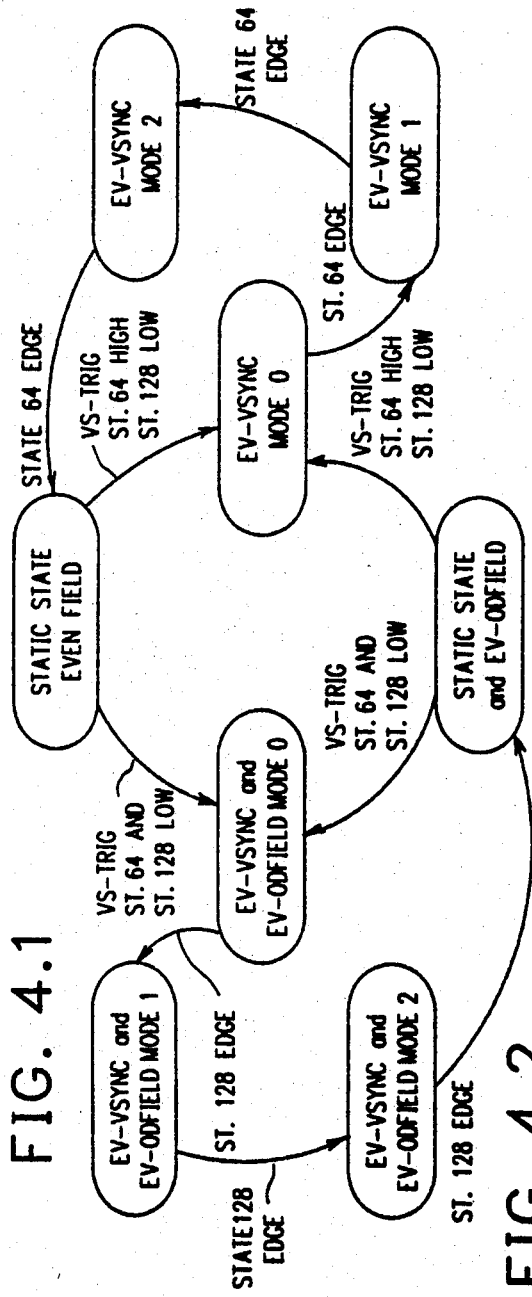
FIG. 4.1
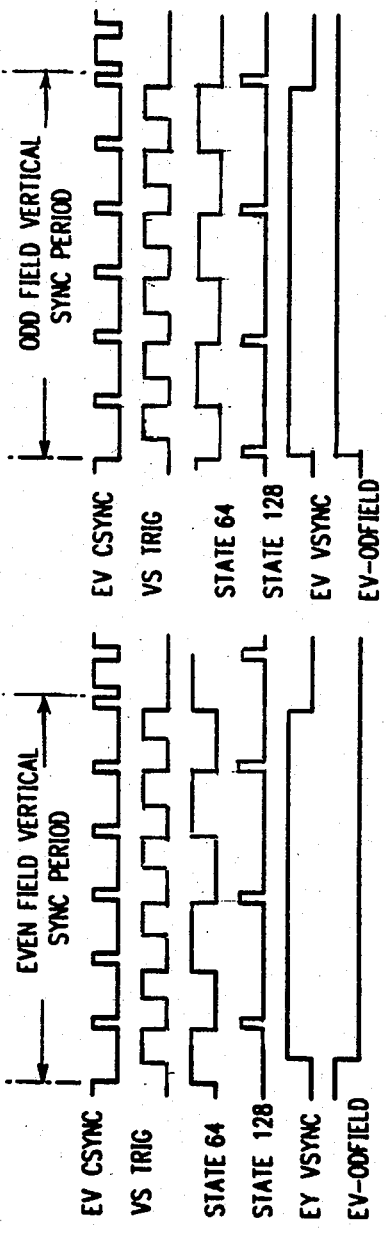
FIG. 4.2

GRAPHIC VIDEO OVERLAY SYSTEM PROVIDING STABLE COMPUTER GRAPHICS OVERLAYED WITH VIDEO IMAGE

FIELD OF THE INVENTION

The present invention relates to video systems having computer graphics overlayed with the video image and, more particularly, to systems for synchronizing the color graphics with the external video signal.

BACKGROUND ART

Many systems are available today that allow overlay of a graphics image with a video image. These systems generally fall into two major categories: systems that do the mixing in the (NTSC) domain, and systems that do the mixing in the red, green, blue (RGB) domain. Mixing the red, green, blue domain is used for high quality, high resolution graphic overlays.

Known systems that mix in the RGB domain have at least one of the following two limitations. The first limitation of such systems is the requirement that the video source, such as a videodisc player (VDP) is externally synchronizable from a reference signal coming from the graphics generator. This approach restricts the selection of the VDP to specific models having external sync input connections at the back of the video player. The second limitation of such known systems involves the loss of graphics synchronization due to a bad sync when the video source is scanning or searching a new video frame. This presents a distorted graphics display when the sync is bad and while resynchronization takes place after the frame has been found. Here, it is difficult to maintain horizontal and vertical synchronization of the graphics image when the video signal source is providing an unstable or otherwise bad external video for synchronization.

Some other known systems switch to an internal sync reference when the system detects an unstable video sync signal. Typically these systems will be out of vertical sync when the video signal finally stabilizes. Re-synchronization of the graphics image when the system finally switches to the stable video sync will cause the monitor to "roll" as it tries to adapt to the new signal. Also, during video scanning, for example on a video disc, it is desirable to see a vertically stabilized video picture while displaying the graphics image. This is not possible on systems that switch to an internal sync reference.

Therefore, in view of the above, it is an object of the present invention to synchronize a color graphics module both horizontally and vertically with an external video signal while maintaining a stable graphics image even though such external video signal may be unstable. It is another object to maintain tight vertical synchronization of a color graphics module with the external video signals even though the color graphics signals and the external video signals are out of tight horizontal synchronism. It is a further object to provide a color graphic video overlay of high resolution computer generated images with video images from a videodisc or videotape or camera.

SUMMARY OF THE INVENTION

These and other objects are achieved by the present invention which provides a color graphic overlay system for providing high speed, high resolution color graphics display combined with a video image from a videodisc, videotape or camera. The system includes a video mixing module and a color graphics module which generates the graphics while the video mixing module performs the overlay function. The video mixing module includes a video decoder for separating an external video signal into its RGB components and for producing an external video composite sync signal, means for synchronizing the color graphics signals both horizontally and vertically with the external video signal. The synchronizing means include a composite sync processor for filtering the external video composite sync signal to produce a processed horizontal sync pulse that is phase adjustable and ultimately used by a phase lock loop to lock the horizontal component of the external video composite sync signal to the horizontal component of the graphics composite sync. The phase lock loop employs the processed horizontal sync pulse to generate a high frequency clock for use by the color graphics module. The color graphics module divides down this high frequency clock producing its own horizontal sync pulses. These horizontal sync pulses are then sent back to the phase lock loop where they are compared to the processed horizontal sync. The phase lock loop then can modify or maintain the frequency of the high frequency clock to bring together or retain the phases of the processed horizontal sync pulse and the color graphics horizontal sync pulse.

Horizontal synchronization means provide a phase adjustable window which regulates the phase lock loop to eliminate the unstable effects of gross phase differences of external video by slowly time sliding the processed horizontal sync pulse to extend or reduce its period until the phase lock loop can compensate therefor.

In this fashion there is maintained the required limits specified for the high frequency clock of the color graphics module to produce stable graphics. Also, the required limits of the horizontal sync time base are maintained by keeping the sync time base changes to the video monitor within such video monitor's horizontal locking capability. Also, the present invention provides a processed horizontal sync pulse that has filtered from it equalizing pulses, vertical sync pulses and any ferroneous pulses generated by the external video source which can cause gross distortions to the high frequency clock of the phase lock loop.

Adjustments are accomplished during the vertical blanking period. The horizontal sync reference adjustment to the monitor is made in small increments such that the monitor can track to maintain a loose horizontal synchronization enabling the monitor to maintain tight vertical synchronization. All adjustments in horizontal phasing are made during vertical blanking of the video monitor such that there are no graphics distortions during the visible portion of the raster.

Also, the horizontal windows are generated during TV lines to filter spurious signals that can mis-synchronize the phase lock loop and graphics generator. System control and timing means predict where video horizontal sync signals should occur and insert a horizontal sync pulse when the external video source is missing horizontal sync signals. Such unfiltered signals can cause gross phase distortions to the phase lock loop and artificially distort the graphics image.

BRIEF DESCRIPTION OF THE DRAWINGS

FIGS. 1.1 and 1.2 together are a functional block diagram of the color graphics module and the video mixing module of the present invention;

FIGS. 2.1 and 2.2 together are a circuit block diagram of the composite sync processor including the horizontal sync processor and the vertical sync processor;

FIGS. 3.1A through 3.1A-2 represent the external video composite sync signal and shows its relationship to the occurrence of the four major states of the horizontal sync processor; FIGS. 3.1B, 3.1B-1 and 3.1C, 3.1C-1 show the odd field and even field composite sync signals; and FIGS. 3.1D through 3.1G include the ideal and typical signals of the external video's composite sync signal;

FIGS. 3.2 A through 3.2L are the timing diagrams of the horizontal sync component of EV-CSYNC, the phase adjustable window (PW) and the processed horizontal sync during the tracking sync state of the horizontal sync processor;

FIG. 3.3A through 3.3F are the timing diagrams of the horizontal sync component of EV-CSYNC, the phase adjustable window (PW) and the processed horizontal sync during the Acquire #1 and #2 sync states of the horizontal sync processor;

FIG. 3.4A, B and C are the timing diagrams of the horizontal sync component of EV-CSYNC, the phase adjustable window (PW) and the processed horizontal sync during the standard sync state of the horizontal sync processor;

FIG. 4.1 is a state diagram for the vertical sync processor; and

FIG. 4.2 are timing diagrams for the sync and, trigger, and timing signals employed in the vertical sync processor.

DESCRIPTION OF THE PREFERRED EMBODIMENTS

Figure 3:
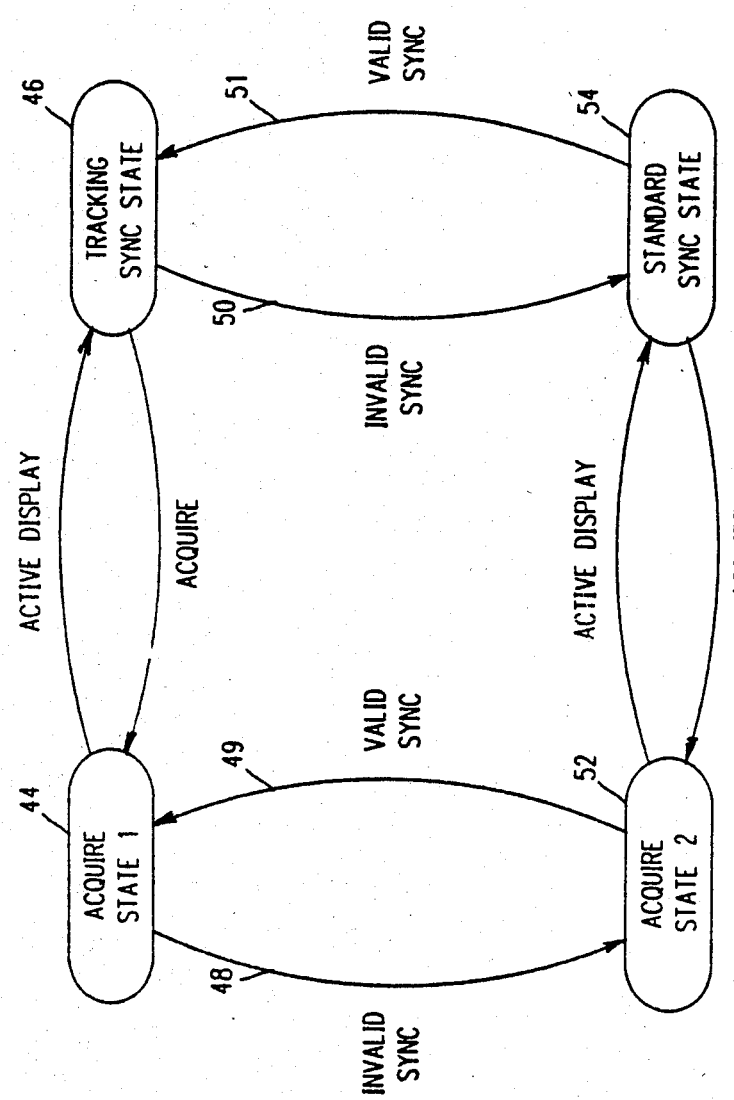
FIG. 3 is a diagram showing the four major states of the horizontal sync processor.

Referring to FIGS. 1.1 and 1.2 there is shown a system block diagram of the video mixing module 10 and the color graphics module 12 for combining a color graphics display with a video image and synchronizing the color graphics module both horizontally and vertically with an external video signal. Video mixing module 10 includes a video decoder 14 that separates a composite video signal from an external video source 16 into its red, green and blue (RGB) components on output line 18 and provides an external video composite sync signal on output line 20 leading into a composite sync processor 22. An analog multiplexer (MUX) 24 receives the external video, RGB signal on line 18 and combines such video image with the color graphics received on line 26 from output of the color graphics module 12.

The video mixing module 10 includes synchronization circuitry in the composite sync processor 22 and a phase lock loop 28 for controlling the frequency of a high frequency clock signal on output line 30 to a timing and control circuit 32 in the color graphics module 12 for thereby phase adjusting the graphics image via the clock line 34 which effects the timing in color graphics module 12.

Referring again to FIGS. 1.1 and 1.2, the composite sync processor 22 filters the external video composite sync signal (EV-CSYNC) on input line 20 to produce a processed horizontal sync pulse (P-HSYNC) on output line 36 that is phase adjustable and ultimately locked by the phase lock loop 28 to the horizontal sync 38 from the color graphics module 12. Generally, the phase lock loop 28 uses the processed horizontal sync pulse (P-HSYNC) to modify the frequency of the high frequency clock until the horizontal sync (HSYNC) received on line 38 from color graphics module 12 (i.e., CGM-HSYNC) is in phase with the processed horizontal sync pulse (P-HSYNC) on line 36. The phase lock loop 28 is of the conventional type and includes a phase comparator or detector for comparing the P-HSYNC and CGM-HSYNC pulses on lines 36 and 38 and generating a positive pulse or a negative pulse depending on the input phase relationships. These positive or negative pulses are used to adjust an integrator capacitor voltage Vo, either up or down, and in turn used to adjust the frequency of a voltage controlled oscillator VCO which provides the high frequency clock HFC signal on output line 30 of the phase lock loop 28. The HFC on line 30 passes through the timing and control circuit 32 and a graphics display controller (GDC) interface 124 in color graphics module 12 where it is used to generate the CGM-HSYNC on line 38 being fed back into the phase lock loop 28. In this fashion, the phase lock loop 28 locks the color graphics module 12 to the processed horizontal sync P-HSYNC.

As will be described in more detail below in connection with FIGS. 2.1 and 2.2 and other figures, the composite sync processor 22 also generates an external video, vertical sync (EV-VSYNC) on line 40 and an external video odd field (EV-ODFIELD) on line 42 which are used by the vertical sync circuit and control circuit in the color graphics circuit module 12 for vertically synchronizing the graphics image and the video image.

Referring to FIGS. 2.1 and 2.2 there is shown a block diagram of the composite sync processor 22 including both the horizontal sync processor portion at the top of the Figures and the vertical sync processor portion at the bottom of such FIGS. 2.1 and 2.2. Generally, the horizontal sync processor portion provides a processed horizontal sync pulse (P-HSYNC) on line 36 to the phase lock loop 28 which compensates for minor phase differences between such processed horizontal sync and the horizontal sync on line 38 from the color graphics module 12. Also, as will be described in detail below, gross phase differences between such horizontal sync pulses occurring, for example, during search and scan operation of a videodisc, are dealt with by the horizontal sync processor's loose horizontal synchronization technique to slowly time slide the processed horizontal sync towards the horizontal component of the external video composite sync to compensate for the gross phase differences between such horizontal component and that of the processed horizontal sync 36. The phase lock loop 28 then reduces the remaining minor phase differences between the processed horizontal sync 36 and the CGM-HSYNC 38 from the color graphics module 12. As a result, the required specification for the limits of the high frequency clock in the color graphics module 12 are maintained and stable graphics are supplied on the RGB output line 26 to the analog multiplexer 24.

Before describing further details of the horizontal sync processor, a description of the four states of the horizontal sync processor shown in FIG. 3 will first be provided. Assuming that the horizontal sync processor is horizontally locked, it alternates between an Acquire State 1 indicated by 44 and a Tracking Sync State indicated by 46. Should the external video composite sync on line 20 provide an invalid sync as indicated on lines 48 and 50, respectively, from the Acquire State 1 and the Tracking Sync state, the horizontal sync processor switches respectively to an Acquire State 2 and a Standard Sync State indicated respectively by 52 and 54.

The two Acquire States 1 and 2 are functionally equivalent and provide a period during the external video's vertical blanking interval wherein a loose horizontal synchronization is maintained with the external video sync. That is, the two Acquire States 1 and 2 provide an N horizontal line time interval in which the period of the processed horizontal sync on line 36 can either be extended or reduced to correct for gross phase differences between the horizontal component of the external video composite sync on line 20 and the processed horizontal sync on line 36. Since this adjusting can cause impulses to the phase lock loop and high frequency clock and resultant display disturbances, the Acquire States are restricted to the inactive portion, or vertical blanking interval, of the video. The occurrence of these Acquire States in relation to the external-video composite sync is illustrated in FIG. 3.1 by signal line 200.

FIG. 3.1A shows the relationship of the various states in relation to EV-CSYNC on line 200. FIG. 3.1B shows the standard composite, odd field sync signal 202 during the vertical blanking interval. FIG. 3.1C shows the standard composite, even field sync signal 204 during the vertical blanking interval. FIG. 3.1D shows the ideal horizontal component of the external video composite sync signal 206. FIG. 3.1E shows a typical external video composite sync signal 208 during normal, search/scan play with erroneous pulses 205 generated by external video, and an equalization pulse 207 shown in broken line, and with dotted pulses 209 shown for shortening or lengthening the period or missing pulse from search, scan, fast or normal play of the external video source. FIG. 3.1F shows the external video composite sync signal 252, and FIG. 3.1G shows the phase adjustable window (PW) timing signal 254.

In the Tracking Sync State, there is normal tracking of the valid external video sync wherein the horizontal component of sync signal from the video source is permitted to be applied directly on line 36 to the phase lock loop 28 with the normal slight adjustments used to insure phase locking in the manner known in the art. In the Standard Sync State, a reference sync generated by an oscillator 56 and a pulse divider 58 in the horizontal sync processor, shown in FIG. 2.1, provide the reference sync clock pulse on line 60 which is used during the normal active displaying period such that a loose horizontal synchronization and tight vertical synchronization are maintained when the external composite sync signal is invalid, as the case when such video source may be in a fast play, a search or a scan mode.

The Tracking Sync State 46 and the Standard Sync State 54 are somewhat similar in their method of generating P-HSYNC on line 36. When the horizontal sync processor is locked and within the tracking sync state, the P-HSYNC generated will be the result of the horizontal component from the external video composite sync on line 20, It is noted that an "invalid" condition occurs as the result of the horizontal component of the external video composite sync signal 252 not occurring during the low period of the phase adjustable window 254, illustrated in FIG. 3.1. Should the external video composite sync on line 20 fall outside the specified window and go invalid for less than a fixed number of continuous horizontal line times, otherwise referred to as N lines, the Tracking Sync State 46 shown in FIG. 3 will substitute a processed horizontal sync (P-HSYNC) shown on line 36 in FIG. 2, based upon the composite sync processor's internal oscillator supplied with clock pulses from a reference sync oscillator 56, and a divider 58 and clock line 60.

Illustrated in FIGS. 3.2A through 3.2B are timing diagrams that dictate the operation of the Tracking Sync State. Under ideal conditions, the horizontal component of the external composite sync signal 210 (FIG. 3.2A) would occur such that the falling edge 211 of such would be enclosed about by the low period of the phase adjustable window 212 (FIG. 3.2B). As a result of the falling edge 211 of signal 210, the processed horizontal sync signal 214 (FIG. 3.2C) would be generated and sent to the phase lock loop on line 36. However due to frequency variations that can exist between the composite sync processor's internal oscillator 56 and the internal time base of the external video source, the period of the horizontal component of the external video composite sync (EV-CSYNC)signal can be longer or shorter, as shown in FIGS. 3.2D by line 216 and FIG. 3.2G by line 222, respectively, than that the period of the composite sync processor phase adjustable window lines 218 and 224 (FIGS. 3.2E and 3.2H).

FIGS. 3.2D, E and F illustrate signals resulting when the period of the horizontal component of EV-CSYNC on line signal 216 is longer than the period of the phase adjustable window on line 218 and shows the edge 221 generated on P-HSYNC line signal 220 by the edge of such signal 216. The edge 223 generated by state 130 of the horizontal sync processor is also shown.

FIGS. 3.2G, H and I illustrate the signals resulting when the period of the horizontal component of EV-CSYNC on line 222 is shorter than the periods of the window PW on line 224 and shows the edge 225 generated in P-HSYNC signal line 226 by the edge of such signal 222. The edge 227 generated by opening the window PW and the occurrence of a horizontal component of EV-CSYNC is indicated.

As a result, the horizontal sync processor during the Tracking Sync State adjusts or tracks the horizontal component to contain it within the low period of the phase adjustable window per lines 218 and 224. Consequently, P-HSYNC tracks the falling edge of the horizontal component of the external video sync signal. The final timing diagram (FIGS. 3.2J, K and L) illustrate the generation of a P-HSYNC on line 232 should the horizontal component line 228 of the external composite sync not occur as indicated by broken line 229 indicating such missing horizontal component. Here, FIG. 3.2K shows the window 230 with the timing lines between the time 129-132. In FIG. 3.2L, the edge 231 is generated by the horizontal component of EV-CSYNC when it does not produce a horizontal component pulse. Also, the pulse edge 233 is generated by state 130 on output line 74 of the horizontal sync processor 62 shown in FIG. 2.1, wherein the sync pulse is inserted for the missing horizontal component of EV-CSYNC.

Referring again to the various states of the system as shown in FIG. 3, and the FIGS. 3.1 and 3.2, it is pointed out that should N invalid lines result, the Trackin Sync State 46 will be switched to the Standard Sync State 54, such Standard Sync State 54 will continue producing a processed horizontal sync (P-HSYNC) but their generation will be totally based upon the internal oscillator of the composite sync processor. This is illustrated in FIG. 3.4. The Standard Sync State 54 will continue until Acquire State 2 occurs. The Acquire State 2 will then attempt to retain a loose horizontal lock or synchronization with the external video composite sync (EV-CSYNC). This loose horizontal lock or synchronization is maintained with the external video composite sync when the sync is outside the predetermined window of a finite state machine or horizontal sync processor 62 shown in FIGS. 2.1 and 2.2. The timing diagrams of FIG. 3.1 illustrate the operation of the horizontal sync processor during Acquire State 1 and 2.

A predetermined number of video fields of Valid Sync are required before the Acquire State 2 and Standard Sync State will switch back to the Acquire State 1 and the Tracking Sync State. This is required so as to further reduce the display disturbances otherwise caused by the continued switching between Acquire State 1/Tracking Sync State and Acquire State 2/Standard Sync State when the videosource is in a mode that produces invalid sync, i.e. videodisc player in search or scan mode. This switch back is indicated in FIG. 3 by the Valid Sync lines 49 and 51 as contrasted with the Invalid Sync lines 48 and 50, respectively.

Oscillator 56 and divider 58 shown in FIG. 2.1 provide the clock signal on line 60 to both the horizontal sync processor 62 and to state counter 64. Counter 64 receives a preload value on line 66 from horizontal sync processor 62 as well as receiving a load signal on line 68 from such processor 62 for producing a phase adjustable window that is generated by the horizontal sync processor 62 and used for compensating gross phase differences as described above and further described below. Also, the state counter 64 provides a state 4 timing pulse on line 70 and a state 128 timing pulse at the 128th counter time on line 72 to the horizontal sync processor 62 for use in controlling the phase adjustable window as well as in determining whether such processor 62 should generate its own processed horizontal sync signal when a horizontal component of the external video composite sync has not been received by time state 130 as described above. This 130th time state line, described also in connection with FIG. 3.2A through L, is provided as a signal on line 74 which results in a processed horizontal sync generated in the horizontal sync processor 62 and outputted on line 74 to gate 75 whenever a horizontal component of the external video composite sync on line 20 is not received by time state 130. A horizontal sync filter comprising gates 77 and 78 establishes a horizontal frame of reference for the graphics to sync since the external video composite sync on line 20 is filtered by the gate 78 by such horizontal sync filter to provide the external horizontal component of the horizontal sync on output line 80 into gate 75 when the external sync is within the phase adjustable window as determined by horizontal sync processor 62 which provides a window enable signal on line 82 thus enabling gate 76.

The Acquire State generator 84 provides an 8 line period during the vertical blanking interval of time during both Acquire States 1 and 2 indicated by blocks 44 and 52 in FIG. 3 when a loose horizontal synchronization is employed, particularly during the search and scan interval when the external video sync is located outside of the phase adjustable window. The Acquire State generator 84 receives both the external video composite sync signal on line 20 and the external video vertical sync on line 40 from the vertical sync processor 86 during such Acquire States when loose horizontal synchronization is maintained. The Acquire State generator 84 provides an Acquire State signal indication on line 88 to both the horizontal sync processor 62 and the horizontal sync filter gate 77 for permitting adjustment of the phase adjustable window during such time. A valid sync detector 90 also receives the external video composite sync on line 20, the external video vertical sync on line 40 and the window enable on 82 and provides a signal on line 92 to both the horizontal sync processor 62 and horizontal sync filter gate 77 for indicating that the external composite sync is signal on line 20 is valid.

FIGS. 3.1A through G, described above, generally show the timing diagrams for the system and include a horizontal component signal 206 of the external video composite sync signal 200 which should occur once in every 130 time divisions. FIGS. 3.2A through L generally illustrate the window (PW) signal 212 which is generally locked and centered about the falling edge of the horizontal component external sync signal 210 after the occurrence of state 129 however before state 130, but such window is permitted to slide as indicated at signals 218 and 224 by one time division as indicated tracking the edge of the horizontal component 216 and 222. A processed horizontal sync (P-HSYNC) signal 214 is shown being generated from an active edge 211 of the horizontal component of external video composite sync (EV-CSYNC) signal 210 after the state 129.

In operation, initially when the external video and graphics sources are locked, the horizontal component of the external video composite sync (EV-CSYNC) is allowed to pass through the window PW that horizontal sync processor 62 generates. This phase adjustable window is allowed to slide in either direction to compensate for gross phase differences. This is accomplished by monitoring the state of EV-CSYNC when the window PW occurs. During the two Acquire States 44 and 52, the window PW is enabled one time division later than the occurrence of state 128 signal 72 to the horizontal sync processor 62. This is one time division before the next predicted occurrence of the horizontal component HC. If HC is low at this point, the horizontal sync processor 62 will pass the low state of the HC to generate P-HSYNC via window enable line 82. Next, the processor 72 loads its state counter 64 via link 68 to generate the next window PW one time division earlier in an attempt to slide the window PW towards the active edge of the horizontal component HC. If, on the other hand, the active edge of the horizontal component HC occurs between stage 129 and 130, the horizontal component HC generates its own P-HSYNC provided on line 80 and reloads its state counter 64 to produce the next PW centered about the next HC. If state 130 is reached without a horizontal component of the external video composite sync, the horizontal sync processor 62 then generates its own P-HSYNC and provides it on line 74, and continues on through stages 130 to 132 waiting for the horizontal component of the external video composite sync (EV-CSYNC) to occur. Should such horizontal component of EV-CSYNC occur, the horizontal sync processor 62 again loads its stage counter to generate a PW about center of the next HC. If HC does not occur before the end of stage 132, the horizontal sync processor 62 reloads its stage counter 64 to slide the window PW out by one time division in an attempt to hunt for the HC edge.

Thus, during the Acquire States shown in FIGS. 3.3A, B and C, there is a loose horizontal sync maintained in which the phase adjustable window PW is incrementally moved toward the horizontal component HC until said HC edge can occur during the PW enabling it to generate P-HSYNC. More specifically, FIG. 3.3A shows the horizontal component of the external video composite sync on line 234, FIG. 3.3B shows the phase adjustable window 236 and FIG. 3.3C shows the processed horizontal sync on line 238 which is generated during the Acquire States 1 and 2 of the horizontal sync processor. The results of such horizontal sync processor are shown when the falling edge of the horizontal component on line 234 leads the phase adjustable window 236. While the FIGS. 3.3A, B and C illustrate the results of the horizontal sync processor when the falling edge of the horizontal component 234 leads the phase adjustable window, the FIGS. 3.3D, 3.3E and 3.3F show the results of the horizontal sync processor when the falling edge of the horizontal component of the external video (EV-CSYNC) on line 240 lags the phase adjustable window on line 242 shown in FIG. 3.3E. The resultant P-HSYNC is shown as signal line 244 in FIG. 3.3F.

During the invalid sync period, such a loose horizontal sychronization is maintained and missing horizontal external video sync pulses are tolerated with the internal sync signals being generated by the horizontal sync processor 62. By maintaining the loose horizontal sync in this manner, tight vertical synchronization is also maintained.

The generation of the processed horizontal sync P-HSYNC during the Tracking Sync State 46 is somewhat similar to that of the two Acquire States. The major difference is that the horizontal sync processor is not allowed to move the phase adjustable window PW more than one time division in any direction, i.e. continuely shrink or stretch the period of window PW. This state allows the normal tracking of the video sync wherein the sync from the videosource is passed directly to the phase lock loop 28. Here, in the Tracking Sync State, the composite sync processor 22 is allowed to relock the window PW about the center of the horizontal component HC (EV-CSYNC) in the event that such horizontal component should occur during time states 129-132. That is, the phase lock loop is allowed to maintain the two horizontal sync signals in phase.

It is noted that in the Standard Sync State 54 shown in FIGS. 3.4A, B and C, there is generated P-HSYNC on an interval of 130 times divisions. This results in the P-HSYNC that is unaffected by the external video HC simply because HC is not monitored during the Standard Sync State. In FIG. 3.4C, the processed horizontal sync on line 250 generated during the Standard Sync State of the horizontal sync processor is shown. Here, it is seen that the results of the horizontal sync processor show that the horizontal component of the external video composite sync on line 246 is ignored during the Standard Sync State and a processed P-HSYNC on line 250 of 130 divisions is maintained. Here it is noted that 130 divisions equal 63.55 microseconds.

Reference is now made to the vertical and horizontal sync processor systems shown in FIGS. 2.1 and 2.2, the vertical sync mode and state diagram in FIG. 4.1, and the vertical sync timing and pulse diagrams of FIG. 4.2. The vertical sync processor 86 of the composite sync processor 22, samples the external video composite sync samples (EV-CSYNC) looking for the start of the vertical synchronization period. This is accomplished by measuring the time interval that the EV-CSYNC is active. Should an extended period occur, a timer 94, which receives EV-CSYNC on line 20, generates a Vertical Sync Trigger pulse (VS-TRIG) on line 95 to the vertical sync processor 86 which, in turn, correspondingly generates the external video vertical sync (EV-VSYNC) on line 40. Next, state 64 and state 128 on lines 96 and 72, respectively, from the state counter 64 are sampled to generate the external video odd field EV-ODFIELD flag on line 42. If both state 64 and state 128 are low, the vertical sync processor 86 disables EV-ODFIELD. On the other hand, EV-ODFIELD is enabled if state 64 is high and state 128 is low. Referring to FIG. 4.1 the video sync processor 86 then proceeds through three mode states, M0, M1 and M2. This is to provide the color graphic module 12 with an EV-VSYNC pulse having an active period which is three horizontal lines long. When EV-ODFIELD is active, the vertical sync processor 86 transistions from state to state on each rising edge of state 128. If however, EV-ODFIELD is reset, the vertical sync processor 86 transistions on state 64. In either case, three edges are required for the completion of the EV-VSYNC pulse. The vertical sync processor then disables EV-VSYNC maintaining the state of the EV-ODFIELD until the next VS-TRIG pulse. The vertical sync line 40, odd field line 42 and M0 and M1 mode states on lines 97 and 98 are indicated in FIGS. 2.

The EV-VSYNC and EV-OLDFIELD are then passed to the color graphic module 12 where they are utilized to monitor and maintain vertical synchronization of the graphics display play controller (GDC) 120 shown FIG. 1.2. This process is accomplished by generating a difference signal (VS-DIF) on line 122 that the controller's micro-computer (an INTEL 8571 chip) can monitor, from the two vertical sync signals (EV-VSYNC and CGM-VSYNC) on lines 40 and 128. This detection of vertical sync differences (VS-DIF) on line 122 is more specifically provided by a vertical sync lock detector 126 which compares the external video vertical sync on line 40 with the vertical sync of the color graphics module on line 128 to determine if such sync signals are more than one horizontal line off. Measuring the active period of VS-DIF, the controller 120 records the successive occurrences of the difference (VS-DIF) that are longer than one horizontal line. Should 16 be detected, the micro-computer chip 120 then instructs a GDC graphics display controller 124, comprising a VLSI graphics chip manufactured by Nippon Electric Corp. under the name GDC 7220, to vertically resynchronize. This starts the synchronization in an odd field. The necessity to monitor 16 occurrences was required to filter possible erroneous EV-VSYNCs resulting from the EV-CSYNC during the invalid sync interval of the external videosource.

The GDC interface control 124 provides a graphics horizontal sync (CGM-HSYNC) on line 38 to the phase lock loop 28, as well as providing vertical synchronization of the graphics image and the external video image. The interface control 124 provides signals on lines 130 to a memory control 132 in the color graphics module 12 for generating the control and timing signals in as well as the address signals needed in the memory control 132 for addressing a refresh memory 134 made up of a twenty, 64 K by one-bit wide dynamic RAM integrated circuit chips. The memory control 132 generates timing signals for seletively writing into multiple pixel planes in the refresh memory 134. A display refresh cycle reads the refresh memory 134 and serializes the data for output via a video output 136 to the display color montior 138 via the analog multiplexer 24 shown in FIGS. 1.1 and 1.2, without altering memory contents. An exclusive OR gate 142 receives VSYNC and HSYNC signals on lines 128 and 38 in the color graphics module 12 and essentially mixes them to provide a composite sync (CSYNC) on line 144 to the color monitor 138. Also, an overlay write cycle is used in the color graphics module 12 for updating the refresh memory 134 without outputting data to the display color monitor 138. In this fashion, the graphic display control circuits 120 and 124 provide for overlay writing on a pixel selective basis into multiple refresh memory planes simultaneously, while also providing a CGM-RGB graphic signal on line 26 from video output 136 to the analog multiplexer 24.

It is noted that the clock signal on line 34 out of the timing and control circuit 32 is provided to the graphics interlace control 124, the memory control 132 and the video output 136 for timing and synchronization purposes. Also, it is noted that the video output 136 provides a graphics select signal on line 140 for selecting the source of the RGB signals for presentation via the analog multiplexer 24 to the color monitor 138.

While the invention has been described above with respect to its preferred embodiments, it should be understood that other forms and embodiments may be made without departing from the spirit and scope of the invention.

What is claimed is:

1. A color graphic overlay system for providing high speed, high resolution color graphics display combined with a video image from an external video source, comprising:

a color graphics module and a video mixing module combined to provide a composite of a graphics image overlayed on the video image, said color graphics module having timing means for producing both color graphics horizontal and vertical sync pulses;

said video mixing module including a video decoder for separating an external video signal into its red, green and buel (RGB) components and for producing an external video composite sync signal therefrom, and sync processor means for synchronizing color graphics signals both horzontally and vertically with said external video composite sync signal;

said sync processor means including horizontal sync processor means for filtering said external video composite sync signal and producing a processed horizontal sync pulse that is phase adjustable and vertical sync processor means for using said external video composite sync signal to produce external video vertical sync siganls for vertically synchronizing said video image and said color graphics image;

a phase lock loop connected to said horizontal sync processor means for receiving said processed horizontal sync pulse and also connected to said color graphics module for receiving a color graphics horizontal sync pulse, the output line of said phase lock loop providing a high frequency clock signal which is connected to said timing means in said color graphics module and used to generate said color graphics horizontal sync pulse, said phase lock loop providing adjustment of the frequency of said high frequency clock output until said color graphics horizontal sync pulse is in phase with said processed horizontal sync pulse and thereby compensates for minor phase differences therebetween;

said horizontal sync processor means including a valid sync detector for determining a valid sync condition if said external video horizontal sync signal is within a predetermined phase adjustable sync timing window, a sync filter connected to the output of said valid sync detector for either providing said external video horizontal sync signal as said processed horizontal sync pulse when a valid sync condition exists or for providing an internal standard sync as said preocessed horizontal sync signal in the absence of a vlaid sync condition, and means for time sliding said timing window incrementally towards the horizontal component of said external video composite sync signal until said signal is within said timing window and a valid sync condition exists wherein said sync filter provides said external video horizontal sync signal as said processed horizontal sync pulse to said phase lock loop, whereby said timing window regulates said phase lock loop by slowly time sliding said processed horizontal sync pulse towards said external video composite sync pulse until said phase lock loop can compensate therefor; and multiplexer means for combining said video image with said color graphics image to provide a composite image.

2. System as recited in claim 1 wherein said means for time sliding said phase adjustable sync timing window includes a counter which receives its timing pulses from an internal oscillator providing said internal standard sync.

3. A system as recited in claim 1, wherein said horizontal sync processor means further includes means for detecting when said system is in a search and scan operation during the inactive video display time, said detection means being used to enable said horizontal sync processor means and said means for time sliding said sync timing window to extend or reduce the period of said timing window and thereby provide loose synchronization only during said inactive period of said video.

4. System as recited in claim 1 wherein said valid sync detector provides a valid sync condition when less then a predetermined number of invalid sync pulse detections are determined within the timing window and indicates an invalid sync condition when more than said predetermined number of horizontal sync detections are outside said timing window.

5. System as recited in claim 1, further comprising in said horizontal sync processor means, means for switching said horizontal sync processor means from a standard sync state in which said processed horizontal sync state pulse is based upon said internal standard sync, to an acquire state wherein said system will attempt to retain a loose horizontal lock with said external video composite sync.

6. System as recited in claim 1, further comprising means for detecting when a predetermined number of valid sync pulses are detected during the period when said horizontal sync processor means employs said internal standard sync of said horizontal sync processor means, after which said system is switched back to a condition in which said horizontal sync processor means is horizontally locked to said external video composite sync signal by means of said phase lock loop.

7. A color graphic overlay system for providing high speed, high resolution color graphics display combined with a video image from external video source, comprising:
  a color graphics module and a video mixing module combined to provide a composite of a graphics image overlayed on the video image, said color graphics module having timing means for producing both color graphics horizontal and vertical sync pulses;
  said video mixing module including a video decoder for separating an external video signal into its red, green and blue (RGB) components and for producing an external video composite sync signal therefrom, and sync processor means for synchronizing color graphics signals both horizontally and vertically with said external video composite sync signal;
  said sync processor means including horizontal sync pocessor means for producing a processed horizontal sync pulse that is phase adjustable and ultimately used to lock the horizontal component of said external video composite sync signal to said color graphics horizontal sync pulse, and vertical sync processor means for using said external video composite sync signal to produce external video vertical sync signals for vertically synchronizing said video image and said color graphics image;
  a phase lock loop connected to said horizontal sync processor means for receiving said processed horizontal sync pulse and also connected to said color graphics module for receiving a color graphics horizontal sync pulse, the output of said phase lock loop providing a high frequency clock signal to said timing means in said color grpahics module for generating said color graphics horizontal sync pulse, said phase lock loop providing adjustment of the frequency of said high frequency clock output until said color graphics horizontal sync pulse is in phase with said processed horizontal sync pulse and thereby compensates for minor phase differences; and
  said horizontal sync processor means including a valid sync detector for determining a valid sync condition when said external video horizontal sync signal occurs within a sync timing window during which time said external video horizontal sync signal is provided as said processed horizontal sync pulse to said phase lock loop, said horizontal sync processor means alternatively providing an internal standard sync as said processed horizontal sync signal to said phase lock loop in the absence of said valid sync condition, and means for gradually time sliding said sync timing window towards said external video horizontal sync signal until said signal is within said timing window and a valid sync condition exists wherein said external video horizontal signal is provided as said processed horizontal sync pulse to said phase lock loop;
  whereby a tight horizontal and vertical synchronization of said graphics display with said external video image is provided when said external video image is stable, and a tight vertical synchronization and a loose horizontal synchronization of said graphics display with said external video image is provided when said video image may be unstable, thereby maintaining a stable visible video monitor raster and graphics display.

8. System as recited in claim 7 wherein said horizontal sync processor means includes filter gating means connected to the output of said valid sync detector for passing said external video horizontal sync signal to said phase lock loop during a valid sync condition.

9. System as recited in claim 7 further comprising means for inserting internally generated horizontal sync pulses to said horizontal sync processor means in the absence of a valid sync condition.

10. An improved color graphics overlay system for providing high speed, high resolution color graphic display images combined with a video image from an external source including a color graphics module for generating color graphics image signals responsive to an external computer, said color graphics module having timing means for producing both color graphics horizontal and vertical sync pulses, and a video mixing module for generating multiplexed composite image signals for a color monitor responsive to said color graphics image signals and to video image signals from an external video source, wherein the improvement comprises:
  a. said video mixing module including:
    i. a video decoder for separating an external video signal into its red, green and blue (EV-RGB) components and for producing an external video composite sync signal (EV-CSYNC),
    ii. sync processor means responsive to said external video composite sync signal (EV-CSYNC) for synchronizing signals produced by said color graphics module with said video image signals from an external video source,
    iii. a phase lock loop responsive to output signals from said sync processor means and said graphics module for producing clock signals for use by said timing means of said color graphics module as an input to produce said horizontal and vertical sync pulses, and
    iv. multiplexer means for combining said color graphics image signals and said video image signals to form said multiplexed composite image signals;
  b. said sync processor means including:
    i. horizontal sync processor means for filtering said external video composite sync signal (EV-CSYNC) to produce a phase adjustable processed horizontal sync pulse (P-HSYNC), and
    ii. vertical sync processor means for using said external video composite sync signal (EV-CSYNC) to produce external video vertical sync (EV-VSYNC) and external video odd field (EV-ODFIELD) signals for vertically synchronizing said video image and said color graphics images;
  c. said horizontal sync processor means including:
    i. a valid sync detector for determining a valid sync condition when the horizontal component (HC) of the said external video composite sync signal (EV-CSYNC) is within a predetermined phase adjustable sync timing window,
    ii. a sync filter responsive to the output of said valid sync detector for providing either said horizontal component (HC) of said external video composite horizontal sync signal (EV-CSYNC) as said processed horizontal sync pulse (P-HSYNC) when a valid sync condition exists or an internal standard sync signal as said processed horizontal sync signal (P-HSYNC) in the absence of a valid sync condition, and iii. means for time sliding said timing window incrementally towards said horizontal component of said external video composite sync signal (EV-CSYNC) until said signal is within said timing window indicating the existence of a valid sync condition wherein said sync filter provides said horizontal component (HC) as said processed horizontal sync pulse (P-HSYNC) to said phaselock loop, and d. said horizontal sync processor means, said color graphic timing means and said phase lock loop being interconnected to cause said phase lock loop to adjust the frequency of said clock signals responsive to said processed horizontal sync pulse (P-HSYNC) and said color graphics horizontal sync pulse (CGM-HSYNC) which is in turn responsive to said clock signals until said color graphics horizontal sync pulse (CGM-HSYNC) is in phase with said processed horizontal sync pulse (P-HSYNC), whereby said timing window regulates said phase lock loop by slowly time sliding said processed horizontal sync pulse (P-HSYNC) towards said horizontal component (HC) of said external video composite sync signal (EV-CSYNC) until said phas lock loop can compensate by adjustment of the frequency of said clock signals.

* * * * *